United States Patent [19]

Podlipnik

[11] Patent Number: 4,775,099
[45] Date of Patent: Oct. 4, 1988

[54] THERMOSTATIC CONTROL APPARATUS FOR OPERATION BETWEEN THE HEATING AND COOLING MODE

[76] Inventor: Kalman Podlipnik, 7911 Kennedy Blvd., North Bergen, N.J. 07047

[21] Appl. No.: 152,009

[22] Filed: Feb. 3, 1988

[51] Int. Cl.[4] .................... G05D 23/00; F25B 29/00; H01H 37/52
[52] U.S. Cl. ................................ 236/1 C; 236/78 A; 165/26; 337/340; 337/373
[58] Field of Search ................. 236/1 C, 78 R, 78 A, 236/78 B, 101 R, 101 D, 101 B, DIG. 1, 46 F; 165/26, 29, 12; 337/331, 333, 336, 337, 338, 339, 340, 360, 373, 374

[56] References Cited

U.S. PATENT DOCUMENTS

| | | | |
|---|---|---|---|
| 3,047,273 | 7/1962 | Scarr, Jr. | 165/26 |
| 3,993,120 | 11/1976 | Iberg et al. | 236/1 C |
| 4,265,299 | 5/1981 | Harnish | 165/29 X |
| 4,270,597 | 6/1981 | Denny | 165/29 X |
| 4,445,567 | 5/1984 | Nelson | 165/29 |

Primary Examiner—Harry B. Tanner
Attorney, Agent, or Firm—Arthur L. Plevy

[57] ABSTRACT

There is disclosed a thermostat controlled apparatus which operates to control operation of a heating system and a cooling system in response to the temperature detected in a given environment. The thermostat has a pair of mercury switches which are coupled to a single bimetallic element which switches are inclined, one with respect to the other. The circuit configuration is such that one switch controls the heating operation while the other switch controls a cooling operation. Heating and cooling occurs within a predetermined range which is adjustable by means of the angular positions of the switches with respect to the bimetallic coil. In this manner one switch will control the heating operation and the other switch controls the cooling operation. There is an area between the setting of the thermostat wherein neither switch operates but during this mode a separate fan is energized to provide air circulation for the given environment.

15 Claims, 8 Drawing Sheets

4,775,099

THERMOSTATIC CONTROL APPARATUS FOR OPERATION BETWEEN THE HEATING AND COOLING MODE

BACKGROUND OF THE INVENTION

This invention relates to thermostatically controlled apparatus and more particularly to such control apparatus for controlling the automatic operation of the heating system and a cooling system in response to the temperature of a monitored environment.

Essentially, there are many facilities which can utilize both air conditioning and heating units for all seasons. Such units may be wall mounted, floor mounted or window mounted units. Even though such units may have their own thermostat controls, it would be desirable to control all such units from a single thermostat unit.

For examples of thermostatically controlled outlets which relate to the separate control of heating and air conditioning systems, reference is made to U.S. Pat. No. 4,687,050 issued to Kalman Podlipnik, the inventor herein, on Aug. 18, 1987 and entitled "Dual Thermostat Controlled Outlets". In that system there is shown a housing which contains two thermostats interviewed so as to enable one thermostat to control the heating operation and the other thermostat to control a cooling operation. As seen in that patent, a housing contains AC power receptacles which are coupled, respectively, to the thermostats to enable a separate heating system to be activated when needed and to enable an air conditioning unit or a fan to be activated during intervals when heating is not required. In any event, there are many references which operate as thermostatic units to afford dual control of both heating and air conditioning systems.

The present invention utilizes a pair of mercury switches or similar devices which are connected to a single bimetallic element, which element is adjusted by an indicator arm and is adapted to sense the temperature of the space or room within preselected temperature ranges. A pair of mercury switches are associated with the thermostat and are operable for controlling the operation of the heating system and the cooling system while providing automatic changeover between heating and cooling. In this manner the mercury switches are interwired so as one mercury switch enables the controlling of heat via the heating system and the other mercury switch controls the cooling operation.

As will be explained, one mercury switch can energize a first load and the other mercury switch can energize a second load. Due to the interconnection and positioning of the switches, when either mercury switch is operable to energize its respective load, such as the heating or air conditioning unit, the other switch cannot function. It is a main object of the present invention to maintain the temperature of the environment at a predetermined temperature within a specified temperature range, which range is purely a function of the setting and the offset between the first and second switches.

BRIEF DESCRIPTION OF PREFERRED EMBODIMENT

A thermostat control apparatus for operating a heating system in one mode and a cooling system in a second mode and operative to maintain a given temperature differential between said heating and cooling modes wherein the temperature of a controlled environment monitored by said thermostat control apparatus is maintained at a value according to said temperature differential, comprising a temperature responsive bimetallic means operative to provide a mechanical displacement according to changes in the temperature of said environment; first and second mercury switches coupled to said bimetallic element and positioned at a given angle with respect to each other, with said first mercury switch adapted to control said heating system and with said second mercury switch adapted to control said cooling system, each of said switches having a common terminal, a normally opened terminal and a normally closed terminal wherein contact can be made between said common terminal and one of said normally opened or closed terminals according to said angular position of one switch with respect to another, with the normally closed contact of said first switch connected to the common terminal of said second switch, with the common terminal of said first switch connected to a source of reference potential, with the normally opened contact of said first switch connected to said heating system and with the normally opened contact of said second switch connected to said cooling system, whereby if the temperature of said environment falls below a given value said first switch is tilted via said bimetallic element to turn on said heating system and as the temperature rises an amount above said given value said first switch is tilted in an opposite direction to turn off said heating system, wherein said second switch is operated in both said conditions to maintain contact between said common and said normally closed terminal, and as said temperature increases above a given value indicative of said angle between said first and second switches, said first and second switches are tilted so that contact is made between said common and said normally opened terminal of said second switch to turn on said cooling system and as said temperature falls said amount said second switch is tilted so that contact between said normally closed terminal and said common terminal is maintained with said first switch maintaining contact between said normally closed terminal and said common terminal during the above temperature operation as controlled by said second switch.

DETAILED DESCRIPTION OF INVENTION

Figure 1:
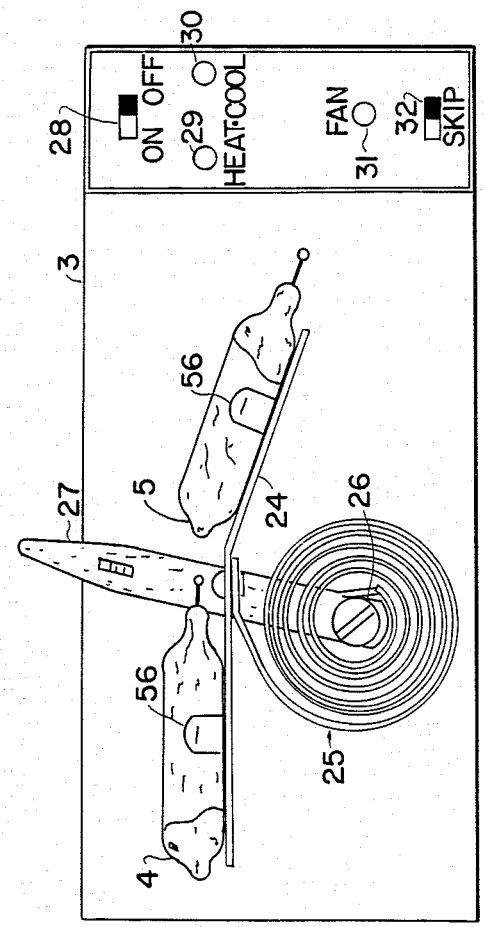
FIG. 1 is a schematic diagram depicting the thermostat control system employing two mercury switches according to this invention.

Referring to FIG. 1 there is shown a simple schematic diagram of a thermostat control apparatus according to this invention. As seen in FIG. 1, there is shown a bimetallic coil 25. The coil 25 is associated with a movable indexing arm 27. The function of the indexing arm is to move the coil a predetermined amount according to a desired temperature setting. As shown in FIG. 1, mounted to the end of the bimetallic coil 25 is a angled planar plate 24. The plate 24 has a predetermined angle and consists of a first section which has mounted thereon a first mercury switch 4 and a second section which is inclined with respect to the first section and has mounted thereon a second mercury switch designated by reference numeral 5.

Each mercury switch, as 4 and 5, are commercially available and many such examples of mercury switches can be commercially purchased. Each mercury switch is associated with a clip device, designated by reference numeral 56, which holds the mercury switch in position on the respective section of the plate 24.

The indexing arm 27 is secured to the coil by means of a conventional screw adjustment or holding mechanism 26. As the indexing arm is moved the coil expands or compresses thus changing the position of the angular plate 24 and thus changing the relative position of one mercury switch as 4 with respect to the other mercury switch 5. As will be explained, each of the mercury switches may be a single pole, double throw-type mercury switch which operates at a particular tilt angle and which, as indicated above, is commercially available. For the sake of general purposes, the entire mechanism is closed within a typical housing designated by reference numeral 3, which housing will have positioned thereon a heating lamp, designated as 29, which lamp will light when the thermostat is in a heating mode, and a cooling lamp 30 which lamp will light when the unit is in the cooling mode.

The unit is associated with an on/off switch 28 enabling one to completely deactivate the thermostat. Also shown is a fan lamp 31 which, as will be explained, will illuminate when the unit is operating between a heating and cooling mode. There is also shown a slide switch 32, designated as a skip switch, which is a double pole, double throw assembly.

Figure 2:
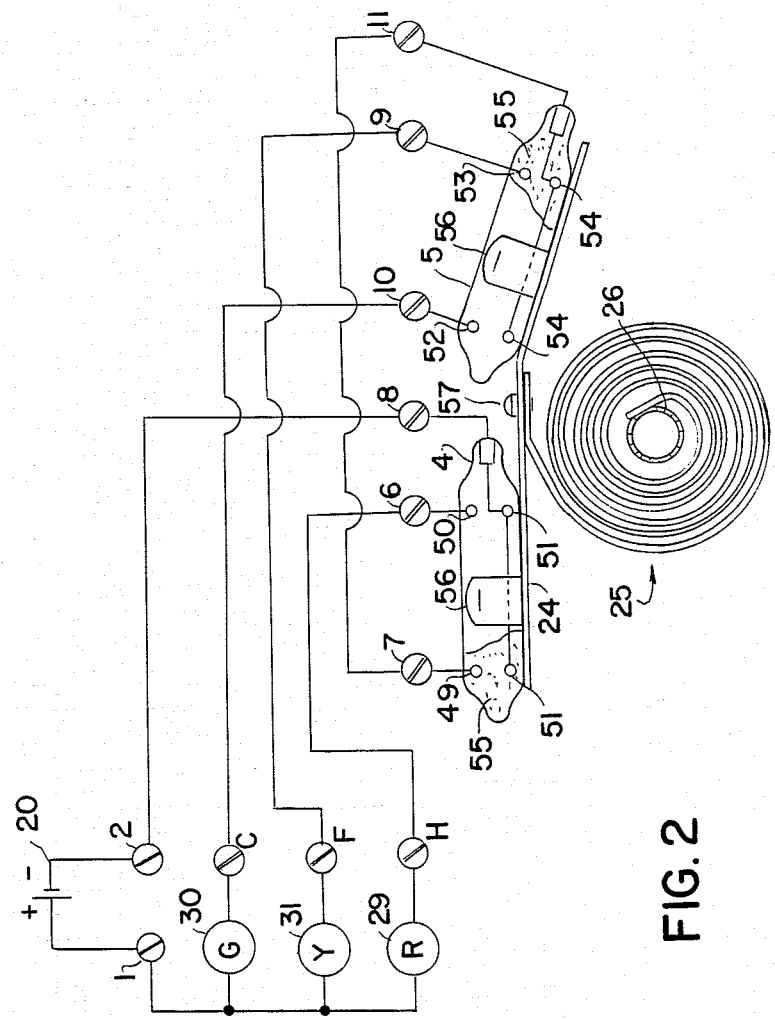
FIG. 2 is a simple schematic diagram of the system shown in FIG. 1.

Referring to FIG. 2 there is shown a schematic diagram indicating how the mercury switches 4 and 5 are wired together. As seen in FIG. 2, the same reference numerals have been retained for corresponding parts. Thus, as seen in FIG. 2 and FIG. 1, the thermostat includes two mercury switches 4 and 5 which are connected to the bimetallic element 25 via an angled assembly plate 24. As seen in FIG. 2, the mercury switches are associated with contacts as 49 and 51. Referring to switch 4 it is noted that contacts 49 and 51 are connected together by means of the pool of mercury 55 (normally closed). In a similar manner, as seen in FIG. 2, if switch 4 were tilted upwardly, the mercury pool 55 would slide to connect contact 50 to 51 (normally opened).

In a similar manner, referring to switch 5 it is seen that contacts 53 and 54 (normally closed) are connected together by means of the mercury pool 55 associated with switch 5. If the mercury switch 5 were again tilted the pool of mercury 55 would slide making contact between contacts 52 and 54 (normally opened).

As seen in FIG. 2, there is a source of potential 20, which may be a 24 volt transformer. The positive terminal of the transformer is connected to input terminal 1 which connects to one terminal of the various lamps as shown in FIG. 1. Thus, there is an indicator lamp 30, which is a green indicator lamp, which is indicative of the system operating in the cooling mode, which is seen by the terminal to the right of indicator 30 designated by the letter C. There is shown a bulb or lamp 31 which is selected to be yellow and which is indicative of the fan mode of operation as indicated by the terminal to the right designated by the letter F. There is a third lamp 29 which illuminates red and which is indicative of the system operating in the heating mode, as indicated by the terminal to the right designated by the letter H.

The common terminal of the source of potential 20, designated by reference numeral 2, is connected to terminal 8 of switch 4 and hence the ground or common terminal is connected to the common terminal 51 of the mercury switch 4. As seen, terminal 51, in the position shown in FIG. 2, is connected via the pool of mercury 55 to terminal 49. Terminal 49 is connected to terminal 7 which is connected to terminal 11 and therefore connected to the common terminal 54 of mercury switch 5. The terminal 54 is connected to terminal 53 via the pool of mercury 55. In turn, terminal 53 is connected to terminal 9 which is connected to the indicator lamp 31. Thus, as can be seen, the indicator lamp 31 receives a ground at terminal F and is therefore illuminated. This indicates that the fan mode is in operation. It is of course understood that by applying a ground to terminal F one can therefore activate a fan by connecting a power relay associated with the fan, to terminal F of FIG. 2. As seen from FIG. 2, the lamps 30 and 29 are not in any manner energized due to the position of the switches as for example shown in FIG. 2.

As one will immediately ascertain, due to the positioning of the mercury switches 4 and 5 on the planar assembly plate 24, the unit can operate automatically in a heating or cooling mode. Furthermore, with regard to the angular section of the plate and the position of switch 4 with respect to switch 5, one can therefore assure that there will also be, for example, a 6°-10° differential between the heating and cooling modes. In regard to each of the modes the thermostat is capable of providing a 1° differential in the heating or cooling mode, therefore maintaining that accuracy.

Referring to FIG. 1 again, the indexing arm 27 is set for a desired temperature which setting automatically controls the heating switch and the cooling switch, which switches as positioned on the plate 24 always assure a given difference (6°-10°) in operation. For example, the heating unit, if set to 70°, will operate until the bimetallic coil 25 moves so that the cooling switch 5 is tilted and will now operate when the temperature reaches 80°. The operation is as follows. When the thermostat, as shown in FIG. 2, is monitoring a given temperature and the temperature falls below 70°, the heating unit is energized by the switch 4 due to movement of the coil to cause the pool of mercury to contact or connect terminal 50 to 54. As seen in FIG. 2, the switch 4 will tilt by means of the bimetallic coil 25 causing the pool of mercury 55 to make contact between terminals 50 and 51. As one can see, this position thereby immediately energizes the heating lamp 29 thus placing a ground at contact H to operate a heating system.

When the temperature rises, the switch 4 goes back to the position shown in FIG. 2 whereby the heating system is again disabled and the fan is operated by the illumination of indicator 31 due to switch 5 being in the position shown. If the temperature begins to rise more rapidly, the switch 5 is moved by the coil. In this manner the pool of mercury 55 associated with switch 5 moves to close contacts 52 and 54 thus connecting the terminal C of indicator lamp 30 to ground thereby energizing the cooling system. This will occur, as indicated above, for a temperature of 10° above the operation of the heating control switch 4. Thus, as one can see from FIG. 2, contacts 52 and 54 are closed, contacts 55 and 51 remain closed and the cooling system is now in operation as manifested by the illumination of lamp 30.

As the area cools off, switch 5 is moved into the position shown in FIG. 2 and the temperature of the room, for example, will drop from 80° to 79°. When this occurs switch 5 will again be in the position shown in FIG. 2 and the fan will automatically operate.

Figure 3:
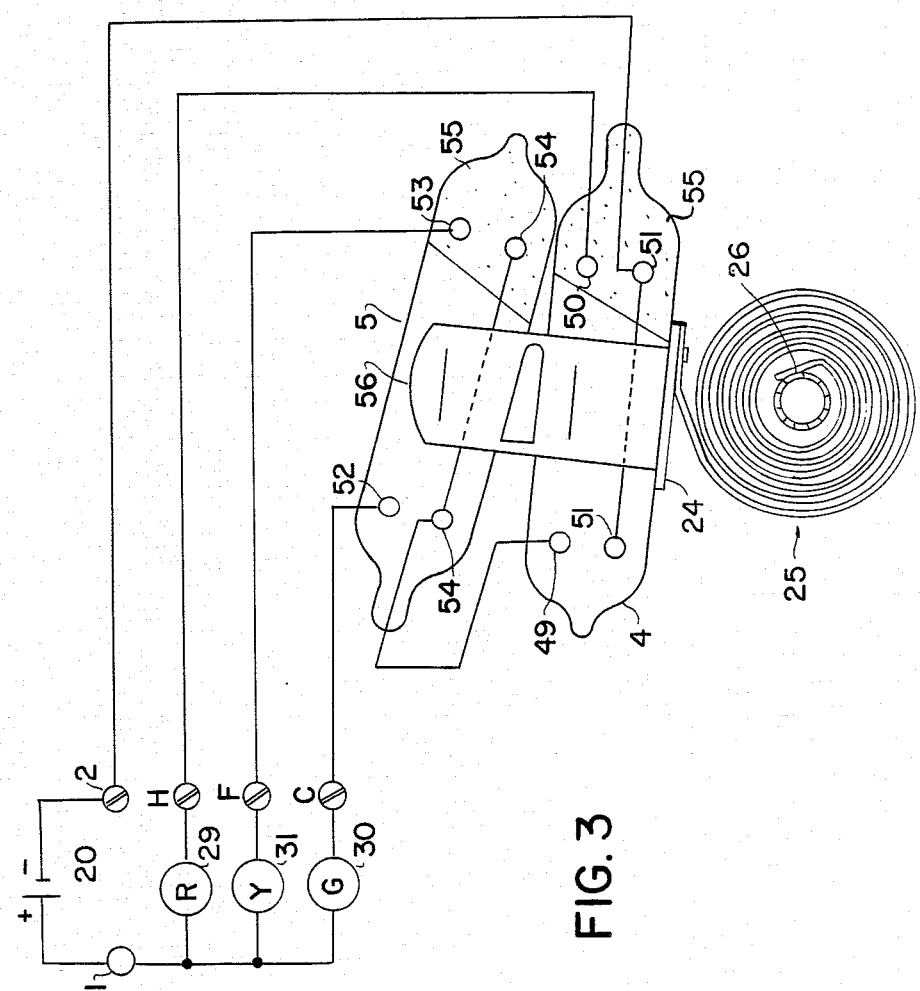
FIG. 3 is an alternate embodiment of a thermostat according to FIGS. 1 and 2.

Referring to FIG. 3 there is shown a schematic diagram similar to FIG. 2. It is noted that the configuration shown in FIG. 3 will operate the same way as that shown in FIG. 2 and therefore the same reference numerals have been retained.

As one can immediately ascertain from FIG. 3, the two switches, as 4 and 5 are again shown but switches 4 and 5 are both associated with a bracket 56 which is mounted on plate 24. The bracket 56 holds switches 4 and 5, as indicated, at predetermined angles with respect to each other with switches 5 and 4 being reversed.

As seen again in FIG. 3, the source of potential 20 is again connected to terminals 1 and 2 which are connected to the various lamps as 30 for cooling, 31 for fan operation and 29 for heating. Terminal 2, which is the common terminal, is directed to contact 51 associated with switch 4 which is coupled to contact 50 via the pool of mercury 55. In this manner terminal 50 is connected to contact 51. The terminal 50 is connected to the heating lamp 29 which places the unit in the heating operation.

In a similar manner, contact 54 of switch 5 is connected to contact 53 via the pool of mercury 55 and, as indicated in FIG. 3, contact 54 is connected to contact 49 of switch 4 which is in the open position. Thus, as shown in FIG. 3, the heating operation is commencing. As soon as the temperature reaches 1° above the setting, as indicated, the pool of mercury 55 will slide in switch 4 to close contact 49 to 51. This immediately places a ground on contact 54. As seen during this operation, contact 54 is connected to contact 53 which, therefore, energizes the fan allowing the yellow light 31 to illuminate, thus keeping the fan in operation.

As the temperature of the room heats up more, the mercury pool 55 associated with switch 5 slides to the left therefore connecting contact 54 to 52 thus turning on the cooling system and illuminating indicator lamp 30 to indicate cooling operation. It is noted in this position that the pool of mercury 55 associated with switch 4 is also closing contacts 49 and 51. During the cooling mode, as the room begins to cool, the bimetallic coil then causes the pool of mercury 55 to slide back to the position shown in FIG. 3 with the pool of mercury 55 of switch 4 still closing contacts 49 and 51 thus operating the unit in the fan mode to circulate air in the environment.

Figure 4:
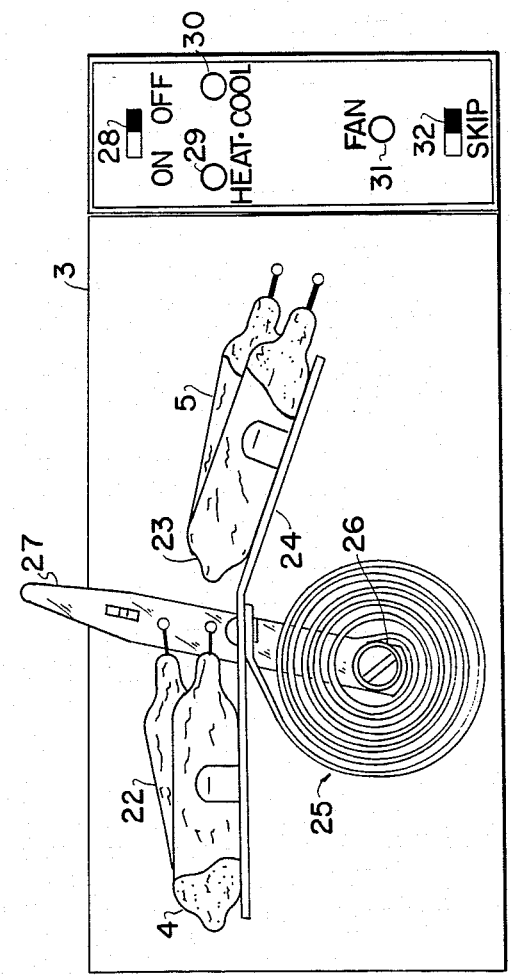
FIG. 4 is an embodiment depicting four mercury switches in a thermostat configuration according to this invention.

Referring to FIG. 4 there is shown still another embodiment of the present invention. As seen, FIG. 4 is basically the same as FIG. 1 with the exception of additional mercury switches 22 and 23 which are respectively associated with the heating and cooling operations and which are positioned at angles with respect to mercury switches 4 and 5 as those shown in FIGS. 2 and 3.

The function of the apparatus shown in FIG. 4 is to provide energy savings due to the presence of the two additional mercury switches. These mercury switches respectfully operate to set or control switches 4 and 5. In this manner the differential between the heating mode and the cooling mode can be 5° instead of 1°. The automatic changeover between the heating and cooling modes is variable, as will be explained. The diagram depicted in FIG. 4 is shown to indicate the physical relationship of the various switches as mounted on the assembly plate 24. It is noted that switch 5 is at an angle with respect to switch 23. Switch 4 is mounted on the assembly plate 24 with switch 22 being tilted with respect thereto. The positions of the switches can be varied by moving the indexing arm 27 to vary the position of the bimetallic coil and hence vary the position of the angular mounting plate 24.

Figure 5:
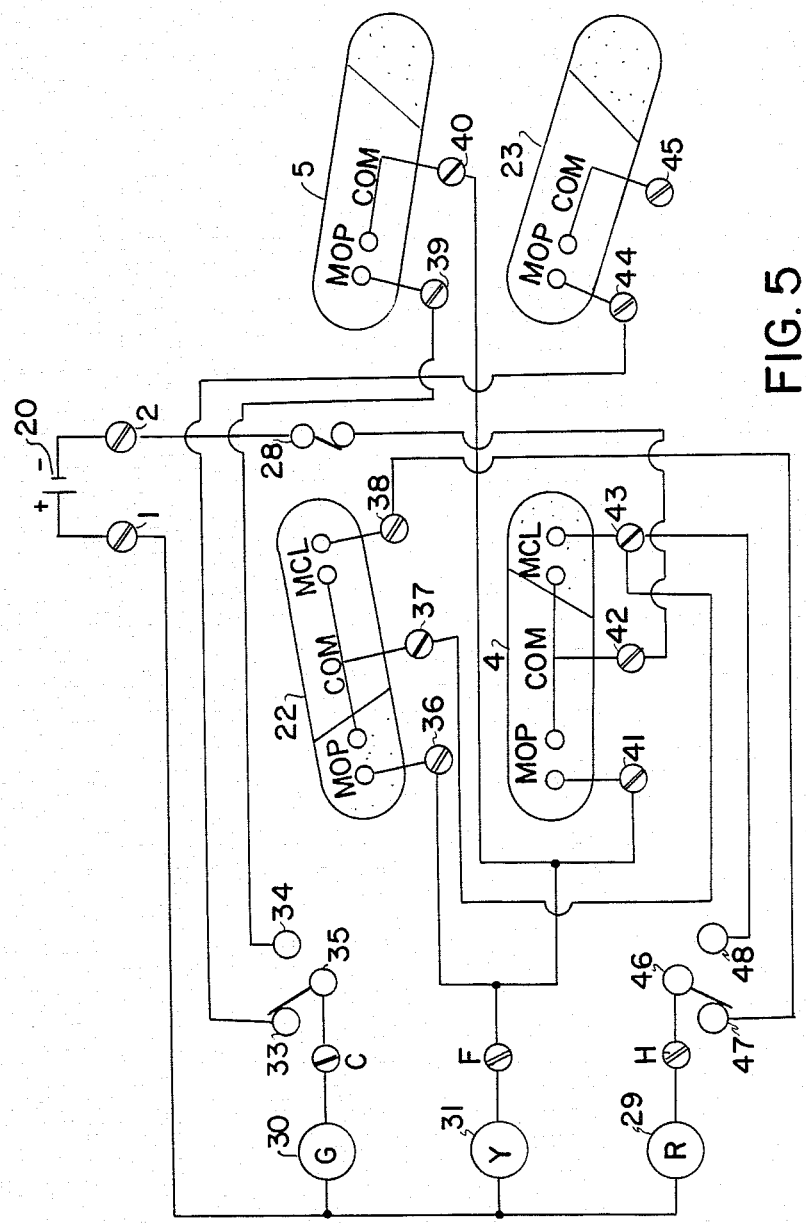
FIG. 5 is a schematic diagram showing the circuit configuration of FIG. 4.

The schematic diagram for the configuration shown in FIG. 4 is depicted in FIG. 5. It is immediately noted in FIG. 5 that there is shown a switch 28 which is coupled to the common terminal 2 of the voltage source 20 and by operating switch 28 in the open position the entire thermostat operation can be eliminated, as should be apparent.

Referring to FIG. 5 it is immediately noted that the common lead 2, as directed through switch 28, is coupled directly to the common terminal 42 of switch 4. As seen in FIG. 5, the common terminal of switch 4 is connected via the pool of mercury to terminal 43. Terminal 43 is coupled to terminal 37 which is the common terminal of switch 22. Switch 22 has the pool of mercury connecting the common terminal 37 to terminal 36 which is connected, as shown, to the fan indicator 31.

Thus as shown in FIG. 5, for the switch positions depicted, terminal 42 is connected to terminal 43 which therefore places a ground on terminal 37 of switch 22 which thereby connects terminal 36 to ground through the pool of mercury associated with switch 22 thereby energizing the fan mode, as indicated by indicator 31. The terminal 36 of switch 22 is also connected to terminal 40 of switch 5. But as seen in FIG. 5, switch 5 is not in operation and is a SPST configuration.

It is also seen that terminal 43 is connected to terminal 48 associated with a manual switch 46. Switch 46, as shown, is connected to terminal 47. In this manner the entire heating operation is strictly under control of switch 22 since terminal 38 of switch 22 is connected via switch 46 to the heating mode or heating indicator 29.

Due to the positioning of switch 22 with respect to switch 4, one therefore will obtain a different changeover between heating and cooling stages. This will be explained as follows. Also shown in FIG. 5 is another manual switch 35 having contacts 33 and 34. As shown in FIG. 5, switch arm 35 is connected to contact 33 which is connected to contact 44 of switch 23. Switch 23, as does switch 5, controls the cooling system and is shown in an inactive state. When switch 35 is operated so that it is in contact with contact 34, the cooling lead is now connected to terminal 39 of switch 5. Hence the changeover operation is as follows. With switch 46 connected to contact 48 and switch 35 connected to contact 34, the automatic changeover between heating and cooling is 5°. In this case the heating is strictly controlled by switch 4 while the cooling is strictly controlled by switch 5. In any event, if switch 46 is now moved to contact 47, as shown, and switch 35 is on contact 34, the changeover between heating and cooling is 10°.

As shown in the diagram, the switch 46 is connected to contact 47 and switch 35 is connected to contact 33, the automatic changeover is 15°. This automatic changeover condition is a function of the angular positions of the switches as 4 and 22 and 5 and 23 on the plate 24. Thus it can be easily seen from the above that one can now change the differential between heating and cooling as from 5°-10°-15°.

Figure 6:
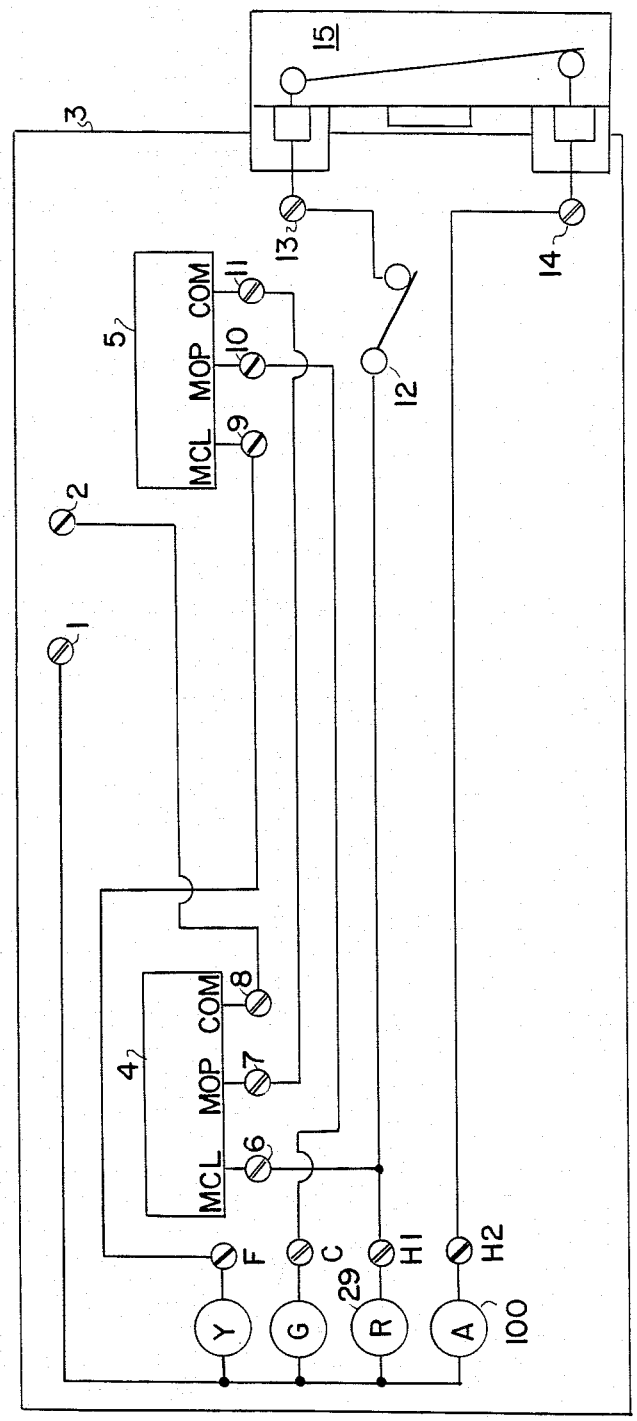
FIG. 6 is a schematic diagram showing a thermostat utilizing a delay timer.

Referring to FIG. 6 there is shown an alternate embodiment of the invention. Essentially, FIG. 6 contains the same exact mercury switch configuration as for example shown in FIGS. 1 and 2 whereby the mercury switches are respectively designated as 4 and 5. As shown in FIG. 6, the output terminal of switch 4, which is designated as 6 and which operates the heating system via the indicator lamp 29, is also connected through an on/off switch 12 to a time delay circuit 15. The time delay circuit 15 is a conventional, plug in delay timer which has an adjustable setting from 0.1 to 8 minutes providing an adjustable delay time. As seen from FIG. 6, when terminal 6 has a ground thereon the ground is directed, via switch 12, to terminal 13 of the delay timer 15. The delay timer 15, after a set delay, closes a contact 120 which places a ground on terminal 14 and thereby sends a ground to an additional heating system designated by H2 and light an amber light 100 to indicate that the additional heating system has been energized. It is seen that if switch 12 were opened the delay timer would not function and hence one would have single stage heating system control.

The purpose of the structure shown in FIG. 6 is to indicate that a two-level heating system, such as two separate heaters for an upper and lower level of a home or office building, can be controlled via the delay timer 15 as shown in FIG. 6.

Figure 7:
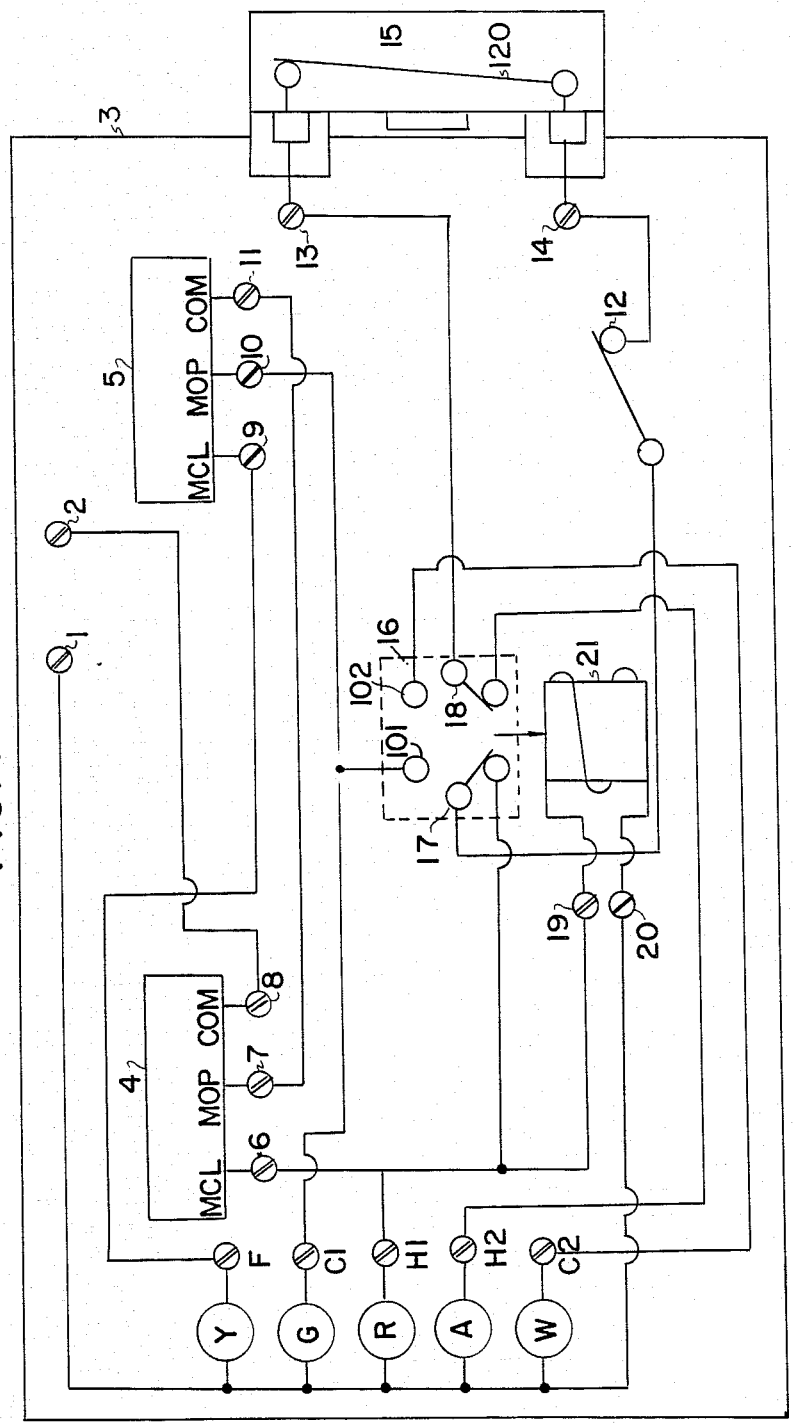
FIG. 7 is a schematic diagram showing a thermostat arrangement utilizing a timer and a switchable relay.

Referring to FIG. 7 there is again shown, in schematic form, the two mercury switches 4 and 5 as shown in FIGS. 1 and 2. The apparatus shown in FIG. 7 is similar to the apparatus shown in FIG. 6 which operates in conjunction with the delay timer 15. FIG. 7 further includes a relay 21 which is associated with double throw double pole contacts 17 and 18 indicated in the dashed line module 16. As one can see from FIG. 7, the relay 21 is activated when terminal 6 of switch 4 is activated. In this manner the contacts are transferred either to the upper or lower contacts, as shown in FIG. 7. Contact 17 is connected to terminal 6 and is connected via switch 12 to terminal 14 of the timer 15. Contact 13 of timer 15 is connected to terminal 18 of the switching relay which is connected to contact H2 associated with the second heating system. Hence in the mode shown the operation is for the control of two heating systems.

There is shown an additional contact designated as C2 which is for a second air conditioning system. Contact C2 is connected to the upper contact of the switching relay whereby contact 18 would be connected to the upper contact and then to the timer to implement double cooling system control. Thus the system in FIG. 7 can operate for a two-stage heating and a single stage cooling system and together with the relay 21, which is a 24 volt AC double pole double throw relay and can be a plug-in type, can operate a two-stage heat and a two-stage cooling system to obtain both heating and cooling temperature control.

The operation of the system would be as follows: The thermostat indexing arm 27 would be set, for example, to 70°. If the temperature of the room falls below 70° the heating system is energized at the same time the mercury switch 4 places a ground on terminal 6. Terminal 6 is connected to terminal 17 as well as terminal 19 energizing the relay coil in the position shown. In this manner terminal 17 is also connected via switch 12 to terminal 14 of the timer. Terminal 13 of the timer is connected via contact 18 to the second heating system thus providing operation of the same after a timed interval. Thus, after a preset time for timer 15, as for example 5 minutes later, the thermostat operates to energize the second heating system or a second load when the temperature rises to 71°. This is as described above. In this way the mercury switch 5 comes into action and as indicated the switch is not operative to energize the cooling system and a ground appears on terminal 9 which causes the fan to operate. During this interval the automatic fan takes over.

As the temperature increases, for example to 75°, the mercury switch 5 activates, as explained above. The activation of mercury switch 5 activates the cooling system via contact 10 whereby the green indicator lamp connected to terminal C1 is activated. A ground is also impressed on the contact of the switching relay 21 which is the top contact designated as 101. Since the heating system is off, the relay 21 is in the upper position whereby contact 17 is contacting contact 101. In this manner the delay timer 15 is activated and contact 13 produces a ground after the timed interval. Contact 18, which is connected to contact 102, now has a ground thereon via contact 13 of the delay timer. This ground is then placed on terminal C2 to operate the additional cooling system after the predetermined time has expired.

Figure 8:
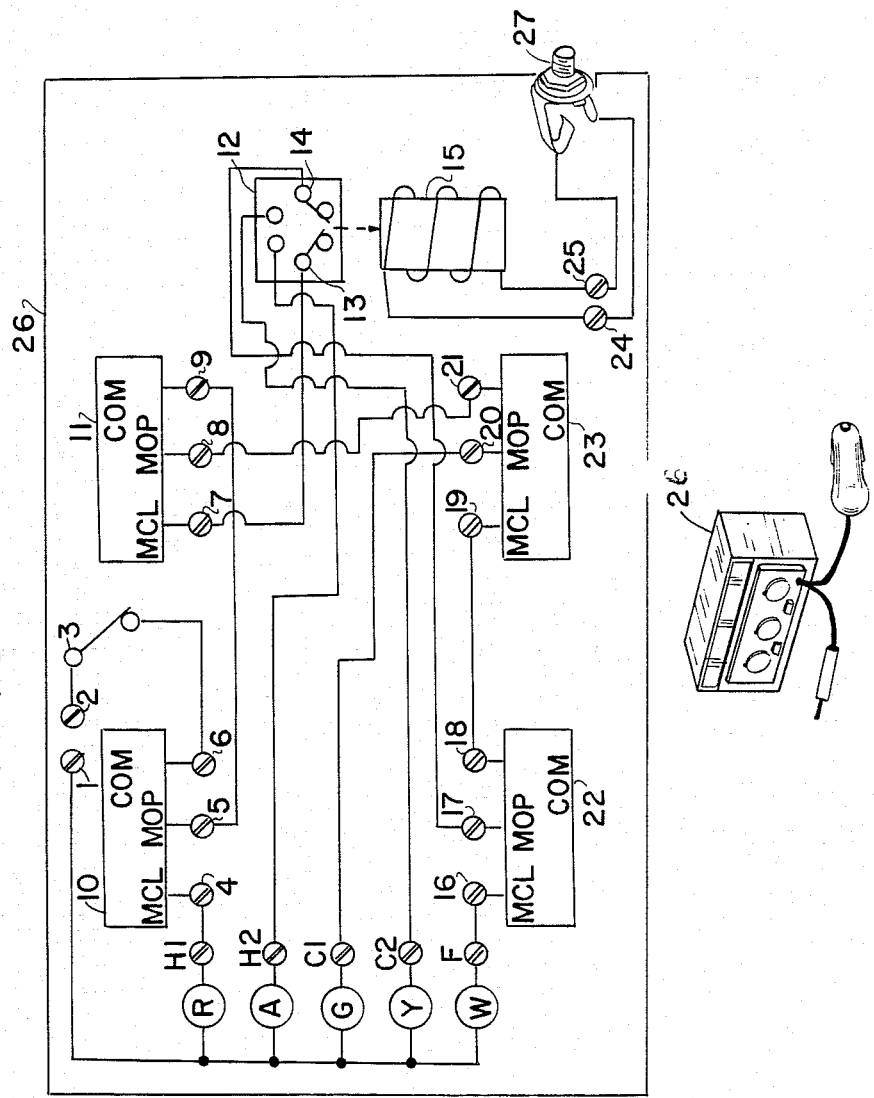
FIG. 8 is a schematic diagram depicting four separate controlled switches operative to provide thermostatic control.

Referring to FIG. 8 there is shown a fully automatic multi-stage thermostat apparatus which essentially includes four mercury switches 10, 11, 22 and 23. Each mercury switch is associated with its own bimetallic coil and each has a separate indexing arm to allow the separate adjustment of each switch with respect to one another. Essentially the switches operate as described above. The thermostat apparatus shown in FIG. 8 allows one to set the switches individually due to the individual bimetallic coils and associated mercury switches. Each switch, as indicated in reference to the above figures, is tilted on its own platform according to the differential required but each switch can be individually controlled.

In the embodiment shown in FIG. 8, for example, the switch 10 can be set to 65°, switch 11 can be set to 70°, switch 23 can be set to 80° and switch 22 can be set to 75°. The switches will operate to provide any differential in regard to the temperature which the heating and cooling systems are controlled by of the switches. In any event, the system also shows the relay which is similar in operation of relay 21 shown in FIG. 7. The relay can be remotely controlled by means of a separate timer or other device to allow either a differential heating mode or a changeover mode whereby a desired differential is maintained.

The unit depicted in FIG. 8, because all controls are independent, exhibits energy savings and the thermostat will operate a heating and cooling system automatically. Thus switches 11 and 22 will operate for normal comfort, thereby energizing the heating and cooling systems, respectively, as above described, while switches 10 and 23 will operate in an energy savings mode, as above described. Thus the above-noted invention utilizes automatic control and the automatic operation of the heating and cooling system in response to detected temperature. The system employs a pair of mercury switches, or similar devices, connected to a single bimetallic element which are movable by a single indicator arm, respectively, and movable for adjusted positions and adapted for sensing the temperature of the space or room within a preselected temperature range.

What is claimed is:

1. A thermostat control apparatus for operating a heating system in one mode and a cooling system in a second mode and operative to maintain a given temperature differential between said heating and cooling modes wherein the temperature of a controlled environment monitored by said thermostat control apparatus is maintained at a value according to said temperature differential, comprising:

a temperature responsive bimetallic means operative to provide a mechanical displacement according to changes in the temperature of said environment;

first and second mercury switches coupled to said bimetallic element and positioned at a given angle with respect to each other, with said first mercury switch adapted to control said heating system and with said second mercury switch adapted to control said cooling system, each of said switches having a common terminal, a normally opened terminal and a normally closed terminal wherein contact can be made between said common terminal and one of said normally opened or closed terminals according to said angular position of one switch with respect to another, with the normally closed contact of said first switch connected to the common terminal of said second switch, with the common terminal of said first switch connected to a source of reference potential, with the normally opened contact of said first switch connected to said heating system and with the normally opened contact of said second switch connected to said cooling system, whereby if the temperature of said environment falls below a given value said first switch is tilted via said bimetallic element to turn on said heating system and as the temperature rises an amount above said given value said first switch is tilted in an opposite direction to turn off said heating system, wherein said second switch is operated in both said conditions to maintain contact between said common and said normally closed terminal, and as said temperature increases above a given value indicative of said angle between said first and second switches, said first and second switches are tilted so that contact is made between said common and said normally opened terminal of said second switch to turn on said cooling system and as said temperature falls said amount said second switch is tilted so that contact between said normally closed terminal and said common terminal is maintained with said first switch maintaining contact between said normally closed terminal and said common terminal during the above temperature operation as controlled by said second switch.

2. The apparatus according to claim 1 wherein said normal closed contact of said second switch is connected to a fan system for operating a fan to circulate air in said environment when said common terminal is connected to said normally closed terminal.

3. The apparatus according to claim 1 further including setting means coupled to said bimetallic element and adapted to bias said element at a given temperature indicative of the temperature to be maintained at said monitored environment.

4. The apparatus according to claim 1 wherein said first and second mercury switches are positioned on an angular bracket coupled to said bimetallic element so that said second switch is at a given angle with respect to said first switch indicative of said temperature differential to be maintained.

5. The apparatus according to claim 1 wherein said temperature differential is 6–10 degrees.

6. The apparatus according to claim 1 wherein said given amount is between 1–6 degrees.

7. The apparatus according to claim 1 further including third and fourth mercury switches with said third switch coupled to said first switch and at a given angle with respect thereto with said third switch at an angle with respect to said first switch to provide heating control within a specified range and with said fourth switch at a given angle with respect to said second switch and coupled thereto to provide cooling control within a specified range.

8. The apparatus according to claim 1 further including timing means coupled to said first switch and operative to provide a given time delay after said first switch turns on said heating system to provide at an output a second delayed signal adapted to control a second heating system.

9. The apparatus according to claim 8 further including switching means coupled to said timing means and adapted to selectively activate said timing means.

10. A thermostat control apparatus for operating a heating system in one mode and a cooling system in another mode and operative to maintain a given temperature differential between said heating and cooling modes wherein the temperature of an environment monitored by said thermostat control apparatus is maintained at a value according to said temperature differential, comprising:

a bimetallic temperature sensing means operative to detect the temperature of said environment and providing a displacement according to temperature changes;

a first mercury switch coupled to said bimetallic sensing means and oriented at a given angle with respect thereto, said switch having a common contact, a normally closed contact and a normally opened contact, where said common contact and said normally closed and opened contacts are connected according to the position of a pool of mercury associated with said switch, whereby in one mode said normally opened contact is connected to said common contact and in a second mode said normally closed contact is connected to said common contact;

a second mercury switch coupled to said bimetallic sensing means and oriented at a given angle with respect to said first switch with said angle selected according to said given temperature differential, said second switch having a common contact, a normally opened contact and a normally closed contact and operative in a first mode wherein said common contact is connected to said normally opened contact by a pool of mercury associated with said switch and in a second mode said common contact is connected to said normally closed contact, with said common contact of said first switch connected to a point of operating potential, with said normally closed contact of said first switch connected to said common contact of said second switch, with said normally opened contact of said first switch connected to a heating terminal for activation of said heater system in said second mode of said first switch, with said normally closed contact of said second switch connected to a fan terminal for activation of a fan unit during said second mode of said second switch, and with said normally opened contact of said second switch connected to a cooling terminal for activation of said cooling system in said first mode of said second switch, whereby for a temperature below a given value said first switch operates in said second mode to energize said heating system and when said temperature rise a specified amount above said given value said first switch operates in said first mode whereby said second switch operates in said second mode to activate said fan, wherein as the temperature rises an amount above said specified amount said bimetallic means operates said second second switch in said first mode with said first switch operated in said first mode to activate said cooling system via said second switch and when said temperature falls said specified amount said second switch is operated in said second mode with said first switch remaining in said first mode until said temperature again falls below said given value.

11. The apparatus according to claim 10 including means coupled to said bimetallic sensing means for adjusting the initial position of said first and second switches indicative of a given temperature setting.

12. The apparatus according to claim 10 further including an angled plate coupled to said bimetallic sensing means and having a first section with said first switch mounted thereon and a second inclined section with said second switch mounted thereon so that when said first section is horizontal said first switch is operative in said second mode and said second switch is operative in said second mode and when said bimetallic sensing means displaces due to a decrease in temperature said first section is moved at an angle above the horizontal to operate said first switch in said first mode, with said second switch operated in said second mode, and when said temperature rises above a given value said first switch operates in said first mode with said second switch operating in said first mode.

13. The apparatus according to claim 10 wherein said bimetallic element is a bimetallic coil.

14. The apparatus according to claim 10 wherein said temperature differential is between 6-10 degrees.

15. The apparatus according to claim 10 wherein said specified amount is between 1-6 degrees

* * * * *